Feb. 3, 1959 K. C. BUGG 2,872,652
COIL CONSTRUCTIONS
Filed March 23, 1956 3 Sheets-Sheet 1

INVENTOR.
Kenly C. Bugg,
BY Wilkinson, Huxley,
Byron & Hume
ATTYS

Feb. 3, 1959 K. C. BUGG 2,872,652
COIL CONSTRUCTIONS
Filed March 23, 1956 3 Sheets-Sheet 2

INVENTOR.
Kenly C. Bugg,
BY Wilkinson, Huxley,
Byron & Hume
ATTYS.

Feb. 3, 1959 K. C. BUGG 2,872,652
COIL CONSTRUCTIONS
Filed March 23, 1956 3 Sheets-Sheet 3
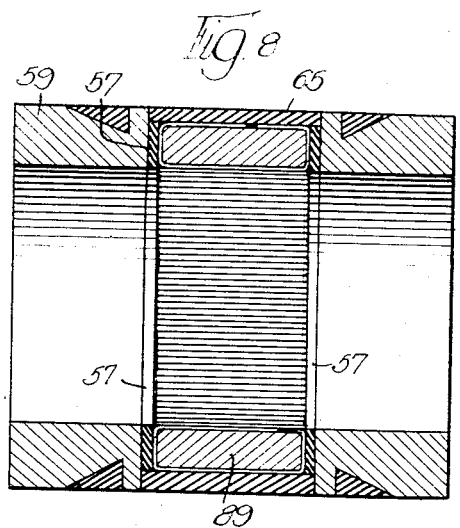
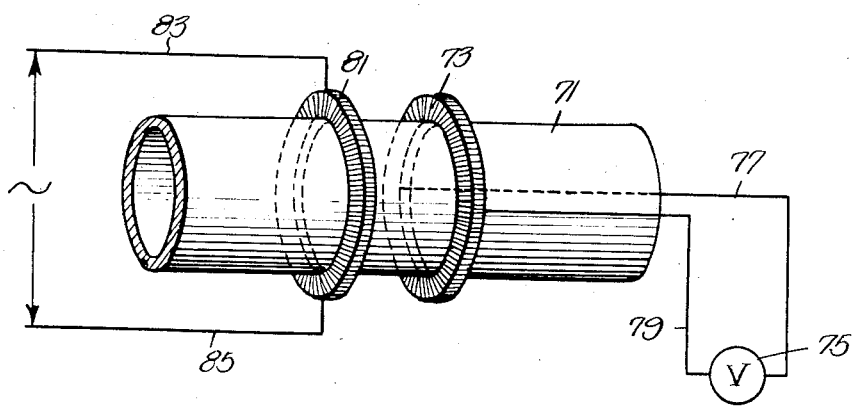
INVENTOR.
*Kenly C. Bugg,*
BY *Wilkinson, Huxley,*
*Byron & Hume* Attys.

United States Patent Office 2,872,652
Patented Feb. 3, 1959

2,872,652

COIL CONSTRUCTIONS

Kenly C. Bugg, Fort Wayne, Ind., assignor to Kendick Manufacturing Company, Inc., Fort Wayne, Ind., a corporation of Indiana Application March 23, 1956, Serial No. 573,392

5 Claims. (Cl. 336—180)

The present invention relates to new and improved coil constructions for electrical and electronic uses. More particularly it relates to coils wound on toroidal cores and to coils comprising a plurality of units wound on toroidal cores, the units being assembled in the relationship best suited for the purpose for which they are intended.

While such coil assemblies have wide application, they have been disclosed herein in particular relation to their use as stators or primaries in induction motors and as deflection yokes for use with cathode ray tubes. The coil units are wound on toroidal cores of magnetic material. These cores may be flat in the shape of washers or elongated in the form of hollow cylinders depending upon the purpose for which the coils are designed. Where extreme accuracy of winding is desired they may be wound upon the apparatus shown in my application Serial No. 296,784, filed July 2, 1952, now Patent 2,757,873. Also for greatest accuracy the coil should have its poles properly oriented with the poles of the magnetic core on which it is wound.

When such coils are used as the stators of induction motors, if multiple units are used the units must be rigidly anchored together and carried in a mounting which may be firmly mounted to resist the motor torque. If single units are used they must also be firmly mounted. Where the multiple units are used as cathode ray tube deflection yokes there is no torque involved and lighter mounting and assembly means may be used. In induction motors a plurality of pole locations are necessary and the individual units may be located at any desired rotatory position about the axis of the assembled multiple unit. The coils of the invention are thus readily adapted for use in multiple pole and multiple phase motors. With deflection yokes there are only two pole positions at an angle of ninety degrees with each other. For either use the assembly may comprise any desired number of units which may be assembled in any desired order for accomplishing the intended result. Adjacent coils at different polar angles may be spaced apart by non-magnetic washers to reduce reactance between the coil fields and also to reduce capacitative coupling. The cores may be made of any desired size and thickness and of magnetic material such as to minimize core losses at the frequencies which may be employed. The windings may be single layer or multiple layer as desired. Outer layers of windings may be made of thinner wire if desired so as to provide the same number of turns as inner layers where the base layer turns are in close contact on the inside of the toroids. Instead of different wire sizes, the layers may be made of wires having different thicknesses of insulation coatings so as to have different outside diameters while maintaining constant linear unit resistance. Where a second layer is wound directly on a first layer, its turns will be in the recesses formed between the contacting surfaces of the turns of the first layer. Thus the first layer defines the pitch for the second and subsequent similarly wound layers. The first layer thus defines the number of turns and the transformation ratio where the coil forms a portion of a transformer. Where such relationship between layers and turns is not required, layers of turns may be separated by non-magnetic spacers where desired to reduce distributed capacity in the circuit.

It is an object of the present invention to provide a new and improved coil assembly.

It is a further object to provide such a coil assembly comprising accurately wound toroidal coil units.

It is an additional object to provide such coil assemblies adapted for use as the primaries of induction motors.

It is also an object to provide such coil assemblies adapted for use as deflection yokes with cathode ray tubes of the magnetic deflection type.

Other and further objects will appear as the description proceeds.

I have shown certain preferred embodiments of my invention in the accompanying drawings in which—

Figure 8 is a view similar to Figure 3 showing a single unit coil; and

Figure 9 is a schematic showing of a method of orienting coil units in multiple coil assemblies.

Figure 4:
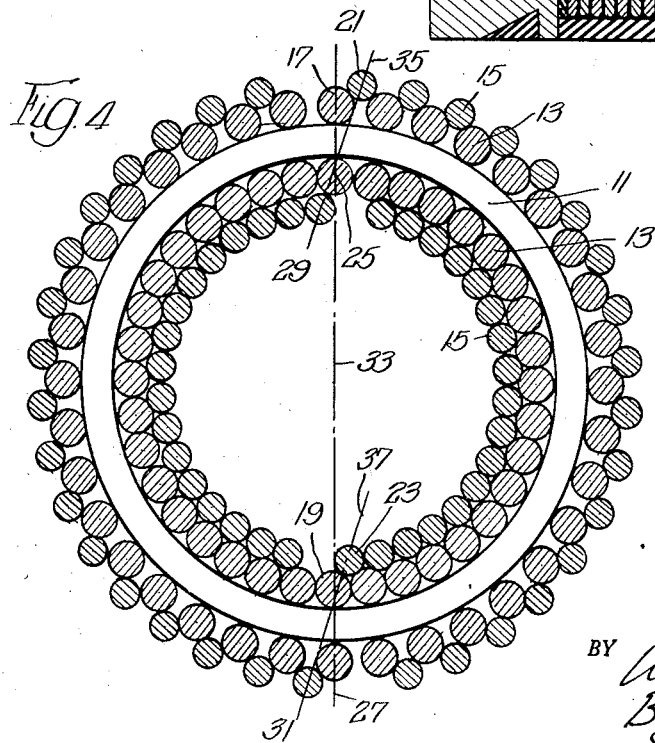
Figure 4 is a diagrammatic showing, on an enlarged scale, of the wires as wound upon a single unit which may be used as part of a multiple unit coil.

A diagrammatic showing of the winding of a core is presented in Figure 4. Where a single unit is to be used, the core 11 may be a tubular cylinder of suitable length. Where multiple units are to be assembled, the core will usually be flat and similar in shape to a metal washer. The cores may comprise a plurality of layers of suitable magnetic material. This may be spirally wound or comprise superposed washer-like elements.

The core, as shown in Figure 4, is wound with an inner layer of wires 13 and an outer layer of wires 15. The size of these wires has been very much exaggerated in order to show their relative placement. Actually very small wire is normally used and a single layer may comprise hundreds of turns.

Figure 5:
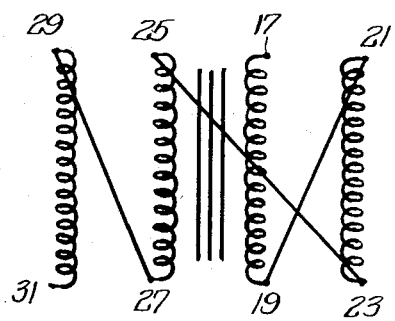
Figure 5 is a wiring diagram of the coil unit of Figure 4.

In order for the apparatus to function with extreme accuracy it is necessary that the wires be wound accurately with uniform spacing and with a uniform number of wires on each half of the core. In the specific winding shown in section in Figure 4 and diagrammatically in Figure 5, the inner or first winding starts at 17 and finishes 180 degrees opposite at 19. This finish at 19 is connected to the start of the second layer at 21 and this second layer ends at 23. The end 23 of the second layer for the first 180 degrees is connected at 25 to the finish of the first layer for the portion of the core from 180 degrees to 360 degrees. The start of the first layer for the 180 degrees to 360 degrees winding is at 27 and this is connected to the finish of the second layer of this winding at 29. The start of the second layer of this winding is at 31. The leads to the coil are connected at 17 and 31. The line of the poles of the first layer is shown by the broken line 33. The lines of the poles of the second layer are shown by the two broken lines 35 and 37.

In the winding, as shown, the inner row or layer of wires 13 is larger than the outer layer 15. The difference in size of the wires is necessary in order that the portion of layer 13 on the inside of the toroid may be placed in close contact with and laid between the similar inner portion of the turns of layer 15. This manner of winding insures the same number of turns per pole and insures uniformity of placement. Without limiting the character or size of the wire, the inner layer wound directly on the toroidal core may be made of No. 36 wire while the second layer may be wound of No. 37 wire. If desired, the actual wire conductors may be of the same size with a greater thickness of insulation on the inner layer than on the outer layer. For example, the wire may be coated with "Formvar," a flexible insulating coating, which type of wire is commercially available, is single coated and up to quadruple coated. The wire size and the difference in diameter of wires in successive layers may be such that a substantial number of layers may be wound, one over the other, with each successive layer wound into the grooves between turns of the preceding layer.

Figure 1:
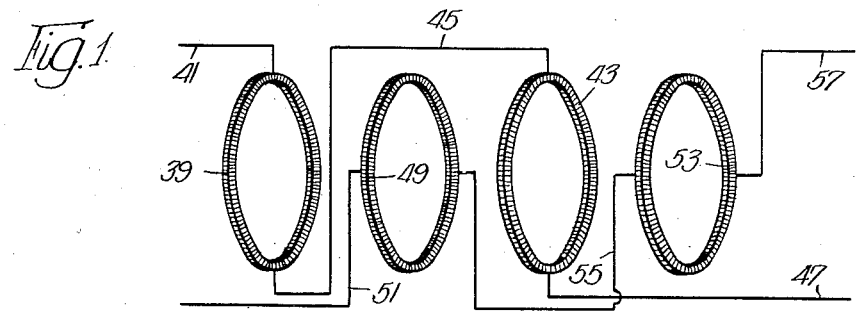
Figure 1 is a schematic expanded view of a multiple unit coil.

In one method, assembling the wound unit coils to make up a deflection yoke for the magnetic deflection of cathode ray tubes the horizontal deflection rings and the vertical deflection rings may be alternated, as indicated somewhat diagrammatically in Figure 1. In that figure the horizontal deflection ring 39 has a lead 41 through which the electrical energy is directed to the ring. This ring is connected in series with a second horizontal deflection ring 43 by the wire 45. The wire 47 extending from ring 43 may lead to additional rings or to control circuits. The vertical deflection ring 49 is connected in the circuit by means of lead 51 and in turn is connected to a second vertical deflection ring 53 between wire 55. The wire 57 is connected to the opposite side of ring 53 in order to provide connection into the circuit or to additional rings. As shown in the drawings, the vertical and horizontal deflection rings are placed with their magnetic axes at 90 degree angles to each other and are alternated in the assembly.

A method of accurately orienting the successive coil units is shown diagrammatically in Figure 9. A non-magnetic cylindrical mandrel 71 of a size to fit into the wound units is used to align them. One unit 73 is positioned on the core and its windings connected to a voltmeter by leads 77 and 79. A second unit 81 is slipped on the mandrel 71 with its leads 83 and 85 connected to a suitable source of alternating current. The unit 81 is then rotated on the mandrel to give the lowest null reading on the voltmeter after which unit 81 is cemented in adjusted position to unit 71. This process is continued until the desired number of units have been assembled on the mandrel. This orientation is for the purpose of providing a coil assembly as shown diagrammatically in Figure 1. Obviously similar methods may be used for orienting other coil assemblies. This electronic orientation gives a much more accurate assembly than a mechanical assembly based on the location of coil terminals. After the desired coil assembly is completed it is removed from the mandrel.

The form of assembly shown in Figure 1 is especially adapted for use with tubes of comparatively small diameter. It permits of extreme accuracy of beam control, but because of the interaction between the adjacent coils the actual deflection of the electron beam is less with a given control voltage than with the type of assembly shown in Figure 6. The units of the coil may be separated by insulating washers to space them and reduce this interactance. This has been indicated at 70 in Figure 7.

Figure 6:
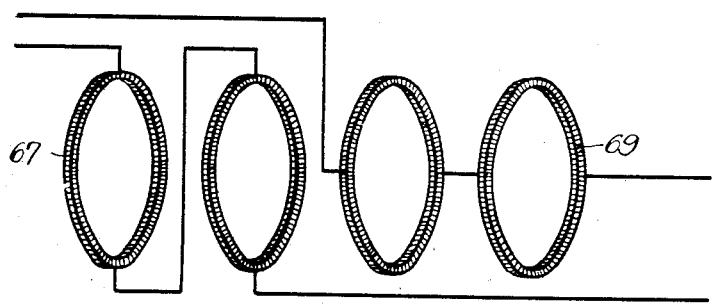
Figure 6 is a view similar to Figure 1 showing a different method of coil assembly.

In the form of assembly shown in Figure 6, the horizontal deflection units 67 are placed at one end of the coil and the vertical deflection units 69 at the other end of the coil. This permits greater deflection with a given control voltage because of great reduction of interactance between the coils as compared to the assembly of Figure 1. It will be understood that the coil units may also be interleaved in multiple units with results between those obtained by the assemblies of Figures 1 and 5. Figures 1 and 6 each show only four units, but it will be understood that an assembly may comprise any number of units.

Figure 2:
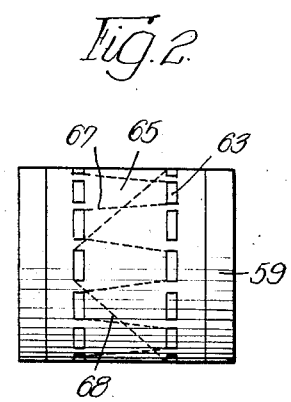
Figure 2 is an elevation of one type of assembled coil.
Figure 3:
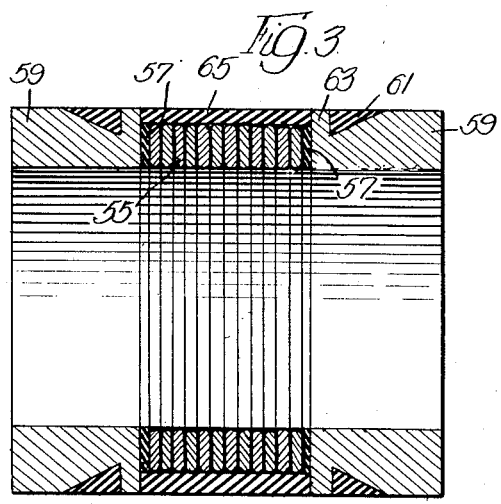
Figure 3 is a longitudinal section of the assembled coil of Figure 2 on a somewhat enlarged scale.

A suitable form of assembly for use as the primary of an induction motor is shown in Figures 2 and 3. Here a multiplicity of individual rings 55 are placed in close juxtaposition to each other and may be held initially in such position by suitable cement. Insulating washers 57 are provided at each end of the assembled rings 55. Holding rings 59 are placed at each end of the group of rings 55, these rings 59 being formed of non-magnetic material such, for example, as aluminum. The preferred construction of the rings 59 is shown clearly in Figure 3. Their outer surfaces are provided with sloping annular grooves 61 and with a circumferential series of teeth 63 at the deeper side of the groove 61. The assembled rings 55, insulating rings 57 and end holding rings 59 may be clamped in a suitable jig and a plastic insulating material 65 formed around the outer surface of the rings 55 filling the circumferential groove 61 and the spaces between the teeth 63. This material will be such that it has adequate strength when it has set to maintain the assembly in fixed relation as shown in Figure 3. If desired, for greater strength a non-magnetic wire or cord may be looped back and forth between opposite teeth 63 as indicated at 67 on Figure 2. A second similar cord or wire 68 may be used as shown, each cord segment extending about ninety degrees of the arcuate surface and such a cord will give increased resistance to relative rotation of the several elements of the assembly due to torque generated between the assembly used as a primary and the secondary of an induction motor.

It will be understood that in an induction motor the relationship between the polarity of the various units of the assembly and their connection in series and in parallel will be in accord with the usual practice in such motors. That is, any number of poles desired may be provided in the primary and the units may be connected as required for multiphase units. In the construction shown in Figure 8, a single tubular core 89 is multilayer wound and is substituted in the assembly of Figure 3 for the multiple units shown therein. It is to be understood that one or a large number of units or any intermediate number of units may be used depending on the design of the device in which the units are to function.

Figure 7:
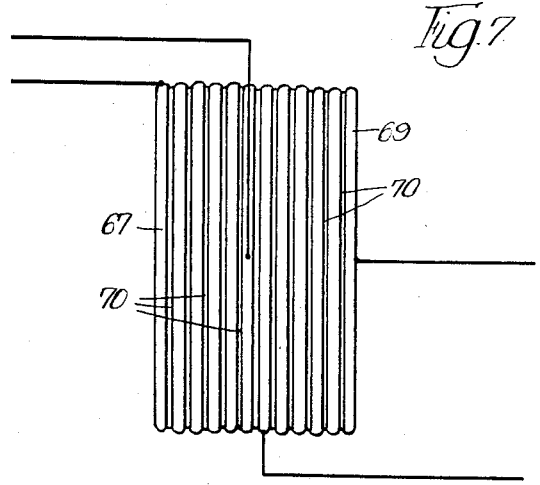
Figure 7 is a side elevation of an assembled coil suitable for use as a deflection yoke for cathode ray tubes.

Referring next to the use of the deflection yoke assembly shown in Figure 7, it will be apparent that the assembled ring may be slipped over the neck of the cathode ray tube and located adjacent the bell portion of the tube as is customary in magnetic deflection yoke assemblies. The windings on the individual coils making up the assemblies must be extremely accurately wound as in order that the assembly may be most efficient in operation. This winding can be accomplished by the winding machine shown in my copending application Serial No. 296,784, filed July 2, 1952. In order to increase the accuracy and uniformity of the fields of the several coils, it is also highly desirable that the coils when wound be properly oriented with the poles of the cores upon which they are wound. An apparatus and a method for locating the poles of the core are disclosed in my copending application Serial No. 566,263 filed February 17, 1956. Because of the accuracy and uniformity of the manufacture of these coils, the deflection control and adjustment circuits normally used with the saddle-type coils now in general use may be simplified and certain component parts eliminated. The saddle-type coils are not uniformly wound and the connecting end turn portions are not always uniformly positioned. Thus the magnetic field across the neck of the cathode ray tube is non-symmetrical with a resultant lack of uniformity of sweep of the electron ray of the tube. While this lack of uniformity may not be such as to seriously affect the picture tube in television, it may be quite serious where the tubes are used in radar sets or other technical equipment where extreme accuracy is important.

While certain preferred embodiments of my invention have been shown and described in connection with specific uses, it is to be understood that these are illustrative only. The invention is capable of further variations to meet different conditions and requirements and adapt it for different uses. I therefore contemplate such modifications as come within the spirit and scope of the appended claims.

I claim:

1. An inductance comprising a plurality of coil units each comprising coils wound upon a toroidal core of magnetic material, said units each having uniform and equal coils upon each side of a polar diameter, said coils being connected in series in each unit and provided with connecting wires at each pole point, said units being assembled to form a hollow cylinder.

2. An inductance comprising a plurality of coil units each comprising coils wound upon a flat toroidal core of magnetic material, said units being wound to provide opposed magnetic poles substantially 180 degrees opposite upon passage of current through the coils, said units being assembled to form a hollow cylinder with certain of the units oriented with their polar diameters extending across the axis of the cylinder in the same plane and others of the units being oriented with their polar diameters located 90 degrees from the polar diameters of the first mentioned units.

3. An inductance comprising a plurality of coil units each comprising coils wound upon a flat toroidal core of magnetic material, said units being wound to provide opposed magnetic poles substantially 180 degrees opposite upon passage of current through the coils, said units being assembled to form a hollow cylinder with certain of the units oriented with their polar diameters extending across the axis of the cylinder in the same plane and others of the units being oriented with their polar diameters located 90 degrees from the polar diameters of the first mentioned units, the units oriented in the same direction being connected in series.

4. An inductance comprising a plurality of coil units each comprising coils wound upon a flat toroidal core of magnetic material, said units being wound to provide opposed magnetic poles substantially 180 degrees opposite upon passage of current through the coils, said units being assembled to form a hollow cylinder with certain of the units oriented with their polar diameters extending across the axis of the cylinder in the same plane and others of the units being oriented with their polar diameters located 90 degrees from the polar diameters of the first mentioned units, the differently oriented units alternating in the cylindrical assembly.

5. An inductance comprising a plurality of coil units each comprising coils wound upon a flat toroidal core of magnetic material, said units being wound to provide opposed magnetic poles substantially 180 degrees opposite upon passage of current through the coils, said units being assembled to form a hollow cylinder with certain of the units oriented with their polar diameters extending across the axis of the cylinder in the same plane and others of the units being oriented with their polar diameters located 90 degrees from the polar diameters of the first mentioned units, the units oriented in the same direction being connected in series, and the similarly oriented units being grouped together at each end of the cylindrical assembly.

References Cited in the file of this patent

UNITED STATES PATENTS

| | | |
|---|---|---|
| 325,619 | Mueller | Sept. 1, 1885 |
| 492,480 | Bradley | Feb. 28, 1893 |
| 1,780,339 | Canton | Nov. 4, 1930 |
| 2,406,740 | Buckbee | Sept. 3, 1946 |
| 2,414,925 | Buckbee | Jan. 28, 1947 |
| 2,423,345 | Roters | July 1, 1947 |
| 2,470,767 | Ellis | May 24, 1949 |
| 2,548,133 | Treat | Apr. 10, 1951 |
| 2,735,989 | Williams | Feb. 21, 1956 |